(12) United States Patent
Maj et al.

(10) Patent No.: US 11,648,924 B2
(45) Date of Patent: *May 16, 2023

(54) BRAKE SYSTEM WITH TWO PRESSURE SOURCES, AND TWO METHODS FOR OPERATING A BRAKE SYSTEM

(71) Applicant: Continental Teves AG & Co. oHG, Frankfurt am Main (DE)

(72) Inventors: Bartosz Maj, Frankfurt (DE); Holger Kollmann, Rodgau (DE); Tomislav Milic, Frankfurt am Main (DE); Alexander Schönbohm, Bad Nauheim (DE); Ralf Schröder, Wehrheim (DE); Marc Lenz, Neu-Anspach (DE); Marcus Bletz, Weilmünster (DE); Jurij Schmidt, Mühltal (DE); Dieter Dinkel, Schwalbach (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 223 days.

This patent is subject to a terminal disclaimer.

(21) Appl. No.: 16/466,469

(22) PCT Filed: Nov. 24, 2017

(86) PCT No.: PCT/EP2017/080297
§ 371 (c)(1),
(2) Date: Jun. 4, 2019

(87) PCT Pub. No.: WO2018/114211
PCT Pub. Date: Jun. 28, 2018

(65) Prior Publication Data
US 2019/0308601 A1    Oct. 10, 2019

(30) Foreign Application Priority Data

Dec. 20, 2016  (DE) ..................... 10 2016 225 537.1

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/326* (2013.01); *B60T 8/4086* (2013.01);
(Continued)

(58) Field of Classification Search
CPC ...... B60T 13/686; B60T 7/042; B60T 13/146; B60T 13/142; B60T 8/4077; B60T 1/10;
(Continued)

(56) References Cited

U.S. PATENT DOCUMENTS 6,058,705 A * 5/2000 Schunck ................. B60T 7/042
60/562
6,209,966 B1 4/2001 Mies
(Continued)

FOREIGN PATENT DOCUMENTS

CN  102490711 A  6/2012
CN  103492247 A  1/2014
(Continued)

OTHER PUBLICATIONS

English translation of WO 2015032637 A1 (Year: 2015).*
(Continued)

*Primary Examiner* — Nicholas J Lane
*Assistant Examiner* — Mahbubur Rashid
(74) *Attorney, Agent, or Firm* — RatnerPrestia

(57) ABSTRACT

A brake system, including four hydraulically actuatable wheel brakes. Each wheel brake is assigned in each case one outlet valve which is closed when electrically deenergized. Each wheel brake is assigned in each case one inlet valve which is open when electrically deenergized. The brake
(Continued)

system furthermore includes a simulator which is actuatable by a brake pedal, wherein two pressure provision devices are provided for actively building up pressure in the wheel brakes, two brake circuits are hydraulically formed, wherein, in each brake circuit, in each case one pressure provision device is hydraulically connected to two wheel brakes, and wherein two separate on-board electrical systems are provided, and wherein each pressure provision device is fed in each case by one of the two on-board electrical systems.

19 Claims, 4 Drawing Sheets

(51) Int. Cl.
  *B60T 8/32* (2006.01)
  *B60T 8/40* (2006.01)
  *B60T 13/16* (2006.01)
  *B60T 8/36* (2006.01)

(52) U.S. Cl.
  CPC .......... *B60T 13/161* (2013.01); *B60T 13/168* (2013.01); *B60T 8/3645* (2013.01); *B60T 2270/10* (2013.01); *B60T 2270/402* (2013.01); *B60T 2270/403* (2013.01); *B60T 2270/413* (2013.01); *B60T 2270/82* (2013.01)

(58) Field of Classification Search
  CPC ...... B60T 13/147; B60T 13/168; B60T 8/348; B60T 8/3655; B60T 13/66; B60T 8/441; B60T 2270/402; B60T 8/44; B60T 8/5081; B60T 11/24; B60T 11/326; B60T 13/167; B60T 8/17; B60T 13/161; B60T 13/52; B60T 13/68; B60T 15/045; B60T 8/366; B60T 8/442; B60T 8/4836
  See application file for complete search history.

(56) References Cited

U.S. PATENT DOCUMENTS

| | | | |
|---|---|---|---|
| 6,410,993 | B1 | 6/2002 | Giers |
| 9,205,824 | B2 | 12/2015 | Feigel et al. |
| 9,415,758 | B2 | 8/2016 | Drumm et al. |
| 9,834,188 | B2 | 12/2017 | Feigel |
| 10,137,877 | B2 | 11/2018 | Feigel et al. |
| 2002/0050739 | A1 | 5/2002 | Koepff et al. |
| 2011/0024249 | A1* | 2/2011 | Nishikawa .............. B60T 7/085 188/349 |
| 2011/0248558 | A1* | 10/2011 | Vollert ...................... B60T 1/10 303/3 |
| 2012/0326492 | A1* | 12/2012 | Mayer ................... B60T 8/4081 303/9.72 |
| 2013/0181506 | A1* | 7/2013 | Weiberle ................... B60T 7/06 303/3 |
| 2014/0152085 | A1* | 6/2014 | Biller ..................... B60T 8/441 303/10 |
| 2016/0009267 | A1 | 1/2016 | Lesinski |
| 2016/0159225 | A1* | 6/2016 | Nakatsu ................... B60T 1/10 701/71 |
| 2016/0167632 | A1* | 6/2016 | Deng .................... B60T 13/745 701/70 |
| 2016/0347298 | A1* | 12/2016 | Jung ..................... B60T 13/745 |
| 2017/0072920 | A1 | 3/2017 | Besier et al. |
| 2017/0129468 | A1 | 5/2017 | Besier et al. |
| 2018/0290640 | A1* | 10/2018 | Johnson ................. B60T 7/042 |

FOREIGN PATENT DOCUMENTS

| | | | | |
|---|---|---|---|---|
| CN | 103552556 | A | 2/2014 | |
| DE | 10036287 | A1 | 2/2002 | |
| DE | 10319338 | A1 | 11/2004 | |
| DE | 10357373 | A1 | 7/2005 | |
| DE | 19634567 | B4 * | 11/2007 | ........... B60T 13/662 |
| DE | 102013204778 | A1 | 9/2013 | |
| EP | 1625061 | B1 * | 11/2006 | .............. B60T 13/66 |
| JP | 5009609 | B2 * | 8/2012 | .............. B60T 13/66 |
| WO | 9839189 | A1 | 9/1998 | |
| WO | 9849038 | A1 | 11/1998 | |
| WO | 2014131645 | A1 | 9/2014 | |
| WO | 2015032637 | A1 | 3/2015 | |
| WO | 2015074936 | A1 | 5/2015 | |
| WO | 2015173134 | A1 | 11/2015 | |
| WO | 2016000858 | A1 | 1/2016 | |

OTHER PUBLICATIONS

Korean Decision for Grant of Patent for Korean Application No. 10-2019-7016918, dated Dec. 29, 2020, with translation, 4 pages.
Chinese Office Action for Chinese Application No. 201780073429. 5, dated Dec. 17, 2020, 8 pages.
German Search Report for German Application No. 10 2016 225 537.1, dated Nov. 10, 2017, with partial translation, 8 pages.
International Search Report and Written Opinion for International Application No. PCT/EP2017/080297, dated Jan. 25, 2018, 11 pages.

* cited by examiner

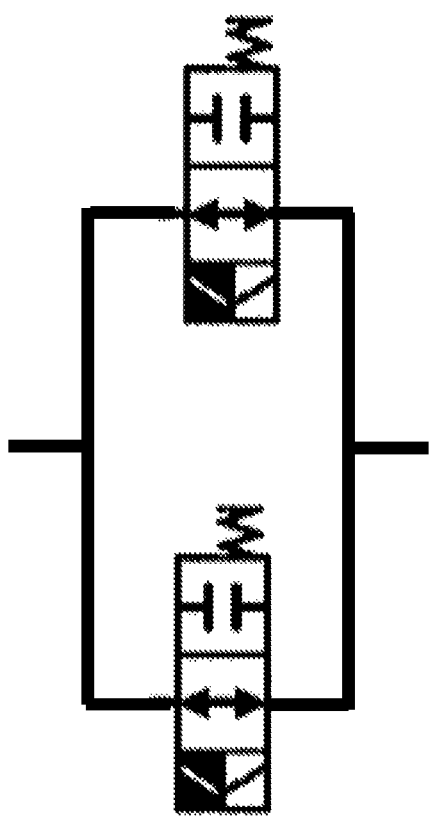

BRAKE SYSTEM WITH TWO PRESSURE SOURCES, AND TWO METHODS FOR OPERATING A BRAKE SYSTEM

CROSS REFERENCE TO RELATED APPLICATIONS

This application is the U.S. National Phase Application of PCT International Application No. PCT/EP2017/080297, filed Nov. 24, 2017, which claims priority to German Patent Application No. 10 2016 225 537.1, filed Dec. 20, 2016, the contents of such applications being incorporated by reference herein.

FIELD OF THE INVENTION

The invention relates to a brake system, comprising four hydraulically actuatable wheel brakes, wherein each wheel brake is assigned in each case one outlet valve which is closed when electrically deenergized, wherein each wheel brake is assigned in each case one inlet valve which is open when electrically deenergized, comprising a simulator which is actuatable by means of a brake pedal, wherein two pressure provision devices are provided for actively building up pressure in the wheel brakes. The invention furthermore relates to a corresponding operating method.

BACKGROUND OF THE INVENTION

In motor vehicle engineering, "brake-by-wire" brake assemblies are being used ever more widely. Brake assemblies of this kind often have not only a master brake cylinder that can be actuated by the vehicle driver but also an electrically activatable pressure provision device (activatable "by-wire"), by means of which actuation of the wheel brakes takes place in the "brake-by-wire" operating mode.

In these brake systems, in particular electrohydraulic brake systems with the "brake-by-wire" operating mode, the driver is decoupled from direct access to the brakes. When the pedal is actuated, a pedal decoupling unit and a simulator are usually actuated, wherein the braking demand of the driver is detected by a sensor system. The pedal simulator is used to give the driver a brake pedal feel which is as familiar as possible. The detected braking demand leads to the determination of a setpoint braking torque, from which the setpoint brake pressure for the brakes is then determined. The brake pressure is then built up actively in the brakes by a pressure provision device.

The actual braking is thus achieved by active pressure build-up in the brake circuits with the aid of a pressure provision device, which is activated by an open-loop and closed-loop control unit. By virtue of the brake pedal actuation being hydraulically decoupled from the pressure build-up, a large number of functionalities, such as ABS, ESC, TCS, slope launch assistance etc., can be implemented in a convenient manner for the driver in brake systems of this kind.

The pressure provision device in the brake systems described above is also referred to as an actuator or hydraulic actuator. In particular, actuators are designed as linear actuators, in which, for the pressure build-up, a piston is displaced axially into a hydraulic pressure space which is constructed in series with a rotation-translation mechanism. The motor shaft of an electric motor is converted by the rotation-translation mechanism into an axial displacement of the piston.

DE 10 2013 204 778 A1, incorporated herein by reference, has disclosed a "brake-by-wire" brake assembly for motor vehicles which comprises a tandem master brake cylinder, which can be actuated by means of a brake pedal and the pressure spaces of which are in each case connected, separably by means of an electrically actuatable isolating valve, to a brake circuit with two wheel brakes, an activatable and deactivatable simulation device, which is hydraulically connected to the master brake cylinder, and an electrically controllable pressure provision device, which is formed by a piston-cylinder arrangement with a hydraulic pressure space, the piston of which is displaceable by an electromechanical actuator, wherein the pressure provision device is connected via two electrically actuatable activation valves to the inlet valves of the wheel brakes.

In brake systems of this kind, a mechanical and/or hydraulic fall-back level is usually provided, by means of which the driver can brake or halt the vehicle by muscle power by actuating the brake pedal if the "by-wire" operating mode fails or is disrupted. Whereas, in the normal mode, the above-described hydraulic decoupling between brake pedal actuation and brake pressure build-up is realized by means of a pedal decoupling unit, this decoupling is eliminated in the fall-back level, thus enabling the driver to directly displace brake medium into the brake circuits. A switch is made to the fall-back level if it is no longer possible to build up pressure with the aid of the pressure provision device.

During normal operation, in the case of a power-assisted brake assembly of said type, the driver actuates a pedal simulator, wherein this pedal actuation is detected by pedal sensors and a corresponding pressure setpoint value for the linear actuator for actuation of the wheel brakes is determined. An advancing movement of the linear actuator out of its rest position into the pressure chamber displaces a brake fluid volume from the linear actuator via the opened valves into the wheel brakes and thus effects a pressure build-up. In the reverse situation, the movement of the linear actuator back in the direction of its rest position leads to a pressure dissipation in the wheel brakes. The setting of a demanded system pressure is performed with the aid of a suitable closed-loop pressure controller or a suitable closed-loop pressure control system, in which, for example, a closed-loop rotational speed controller is subordinate to the closed-loop pressure controller.

By-wire brake assemblies are also known in which two pressure provision devices are provided. For example, in each case one pressure provision device may build up pressure in one brake circuit.

SUMMARY OF THE INVENTION

An aspect of the invention is a brake assembly of said type with two pressure provision devices which satisfies high demands with regard to fail-safe operation. It is furthermore sought to specify a corresponding operating method.

With regard to the brake assembly, according to an aspect of the invention two brake circuits are hydraulically formed, wherein, in each brake circuit, in each case one pressure provision device is hydraulically connected to two wheel brakes, and wherein two separate on-board electrical systems are provided, and wherein each pressure provision device is fed in each case by one of the two on-board electrical systems.

An aspect of the invention is based on the consideration that, in the case of a brake assembly with two electrically actuatable pressure provision devices, it would be advantageous to provide the driver with a fall-back level with active pressure build-up in the wheel brakes even in the event of a failure of the electrical supply of a pressure provision device. In this way, the brake assembly does not need to be designed for mechanical intervention by the driver in the fall-back level, and it is for example possible for a dry simulator or master brake cylinder to be used.

As has now been identified, this can be achieved by virtue of two separate on-board electrical systems being provided, wherein each of the two on-board electrical systems feeds one of the two pressure provision devices. In this way, it is always possible for pressure to be actively built up even in the event of a failure of one on-board electrical system, such that, as it were, a fall-back level is made possible in the by-wire operating mode.

It is preferable for each of the electrically actuatable pressure provision devices to be fed in each case by exactly one or by only one of the two on-board electrical systems. This reduces the outlay for the electrical connections.

It is preferable if a first pressure provision device of the pressure provision devices is fed exclusively by a first on-board electrical system of the on-board electrical systems, and the other (second) pressure provision device of the pressure provision devices is fed exclusively by the other (second) on-board electrical system of the on-board electrical systems.

The two on-board electrical systems are separate. This advantageously means that the two on-board electrical systems are electrically independent of one another, in the sense that a failure of the first on-board electrical system does not cause a failure of the second on-board electrical system, and vice versa. For example, the two on-board electrical systems are galvanically separate.

It is advantageous if each of the two pressure provision devices is non-separably hydraulically connected to two of the inlet valves, which are open when electrically deenergized, of the wheel brakes of a brake circuit and is separably connected to two more of the inlet valves, which are open when electrically deenergized, of the wheel brakes of the other brake circuit. This hydraulic circuit configuration makes it possible that, in a normal operating mode, each of the two pressure provision devices actively builds up pressure in exactly one of the two brake circuits whilst being hydraulically isolated from the other two inlet valves of the wheel brakes of the other brake circuit. In the event of a failure of one of the two pressure provision devices, it is however possible, if the isolation is eliminated, for the pressure provision device that is still functional to actively build up pressure in all four wheel brakes.

It is preferable if no check valve is connected hydraulically in parallel with respect to the respective inlet valve. It is achieved in this way that, with the inlet valve shut off or closed, brake fluid can be held in the wheel brake.

It is preferable if in each case one closed state detection device is provided for each inlet valve. In the case of a jammed valve, that is to say an inadvertently closed inlet valve, it is possible, in the event of the closed state being identified, for the pressure dissipation in the respective wheel brake to be initiated or performed by means of the corresponding outlet valve which is closed when electrically deenergized.

In each case two inlet valves of a brake circuit are preferably fed by the same on-board electrical system. In the event of failure of one of the two on-board electrical systems, the corresponding inlet valves move into their electrically deenergized open state, such that pressure can be built up in the associated brakes by the pressure provision device that is still active.

It is advantageous if, in each brake circuit, in each case one outlet valve is fed by one of the two on-board electrical systems. In the event of failure of one of the two on-board electrical systems, it is possible in each of the two brake circuits for in each case at least one outlet valve to be activated for the targeted build-up of pressure.

In a preferred embodiment, a simulator is provided which is actuatable by means of a brake pedal, wherein a travel sensor, which is preferably of redundant configuration, is provided for detecting the pedal travel. By means of the pedal travel sensor, a driver braking demand is determined, which preferably represents a setpoint brake pressure.

In a preferred embodiment, an isolating device is provided by means of which the two brake circuits, in a, in particular exactly one, connecting position, are hydraulically connected to one another such that each wheel brake is hydraulically connected to each of the two pressure provision devices, and, in an isolating position, are hydraulically isolated from one another.

The isolating device is preferably fed by each of the two on-board electrical systems. It is achieved in this way that, in the event of a failure of one of the two on-board electrical systems, the isolating device is switched into its connecting position, such that the pressure provision device that is still active can actively build up pressure in both brake circuits.

The isolating device is preferably in the form of an isolating valve which is closed when electrically deenergized.

The isolating device advantageously comprises two isolating valves, each of which is fed by exactly one of the on-board electrical systems. Here, it is preferable for two valves which are open when electrically deenergized to be connected hydraulically in series, or for two valves which are closed when electrically deenergized to be connected hydraulically in parallel (as shown in FIG. 4).

The advantages of aspects of the invention lie in particular in the fact that, by means of the described configuration, even in the event of a complete failure of one on-board electrical system, it is still possible for pressure to be actively built up in all four wheel brakes, whereby a by-wire fall-back level is realized. The simulator or master brake cylinder accordingly requires no hydraulic access to the brakes.

An aspect of the invention furthermore relates to a method for operating a brake system according to an aspect of the invention.

It is preferable if, in the event of a failure of one of the on-board electrical systems, the isolating device is switched into its connecting position. It is thus possible for all wheel brakes to be actuated by means of that pressure provision device whose on-board electrical system has not failed.

In the event of a pressure dissipation being required in one of the wheel brakes and a closed state of an inlet valve which cannot be opened being identified, the outlet valve assigned to the wheel brake is preferably opened.

BRIEF DESCRIPTION OF THE DRAWINGS

An exemplary embodiment of the invention will be discussed in more detail on the basis of a drawing. In the drawing, in a highly schematic illustration:

FIG. 4 shows two isolating valves which are connected hydraulically in parallel.

In all of the figures, identical parts are denoted by the same reference designations.

DETAILED DESCRIPTION OF THE PREFERRED EMBODIMENTS

Figure 1:
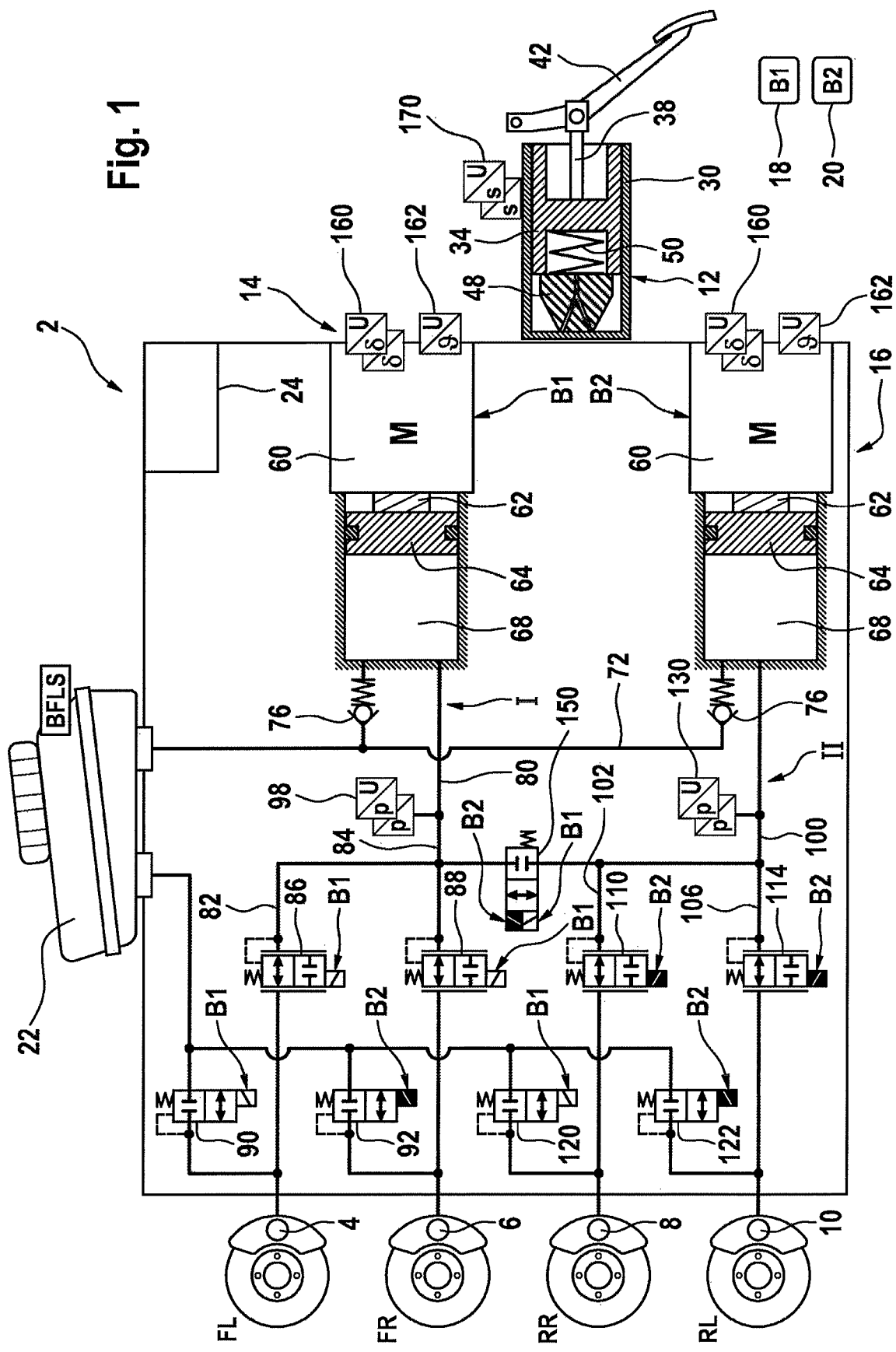
FIG. 1 shows a brake system with two independent on-board electrical systems in a preferred embodiment.

A brake system 2 illustrated in FIG. 1 comprises four hydraulically actuatable wheel brakes 4, 6, 8, 10, a simulator 12, two pressure provision devices 14, 16, two independent on-board electrical systems 18, 20, a pressure medium reservoir 22 which is at atmospheric pressure, and an open-loop and closed-loop control unit 24.

The simulator 12 which is formed in the manner of a master brake cylinder comprises a master brake cylinder piston 34 which is arranged in a master brake cylinder housing 30 and which is coupled by means of a piston rod 38 to a brake pedal 42. In the event of actuation of the brake pedal 42, the master brake cylinder piston 34 is pressed against an elastic element 48 which is likewise arranged in the master brake cylinder housing 30. A further elastic element 50 supports the piston 34 on the elastic element 48 and, when the brake pedal is not actuated, pushes the piston 34 into its rest position. The simulator 12 is of dry design, that is to say it comprises no pressure chamber filled with pressure medium. The simulator 12 is, as it were, a simulator combined with a master brake cylinder.

Both pressure provision devices 14, 16 are electrically actuatable.

For this purpose, both pressure provision devices 14, 16 have in each case one electric motor 60, the rotational movement of which is converted by means of a schematically indicated rotation-translation mechanism 62 into a translational movement of a pressure piston 64, which, for the active build-up of pressure in the wheel brakes 4-10, is displaced into a hydraulic pressure chamber 68. The two pressure chambers 68 are connected via an intake line 72 to the pressure medium reservoir 22, wherein, in each case between the pressure chamber 68 and the intake line 72, there is arranged a check valve 76 which permits a flow of pressure medium from the pressure medium reservoir 22 into the pressure chamber 68 and which blocks in the opposite direction.

A system pressure line 80 connects the pressure provision device 14 hydraulically to wheel brake lines 80, 82 which are connected to the wheel brakes 4, 6. In each case one inlet valve 86, 88 which is open when electrically deenergized is connected into the respective wheel brake line 80, 82. Between the inlet valve 86 and wheel brake 4 and between the inlet valve 88 and wheel brake 6, in each case one outlet line branches off from the respective wheel brake line 82, 84 to the pressure medium reservoir 22, into which outlet line there is connected in each case one outlet valve 90, 92 which is closed when electrically deenergized. The pressure in the system pressure line 80 is measured by a pressure sensor 98 which is preferably of redundant configuration.

A system pressure line 100 connects the pressure provision device 16 hydraulically to wheel brake lines 102, 106 which are connected to the wheel brakes 8, 10. In each case one inlet valve 110, 114 which is open when electrically deenergized is connected into the respective wheel brake line 102, 106. Between the inlet valve 110 and wheel brake 8 and between the inlet valve 114 and wheel brake 10, in each case one outlet line branches off from the respective wheel brake line 102, 106 to the pressure medium reservoir 22, into which outlet line there is connected in each case one outlet valve 120, 122 which is closed when electrically deenergized. The pressure in the system pressure line 100 is measured by a pressure sensor 130 which is preferably of redundant configuration.

A first brake circuit I comprises the two wheel brakes 4, 6 which are hydraulically connected to the pressure provision device 14. A second brake circuit II comprises the two wheel brakes 8, 10 which are hydraulically connected to the pressure provision device 16.

The two brake circuits I, II can be hydraulically connected to one another by means of an isolating device 150 which is closed when electrically deenergized, and in the example, the isolating device is designed as an electrically actuatable circuit isolating valve.

The division of the two brake circuits I, II is black and white; the two wheel brakes 4, 6 of the brake circuit I are front-wheel brakes and the two wheel brakes 8, 10 of the brake circuit II are rear-wheel brakes.

In the case of the two pressure provision devices 14, 16, the rotor position is measured in each case with the aid of a rotor position sensor 160, which is preferably of redundant configuration. A temperature sensor 162 measures the temperature of the motor coil. The pedal travel of the brake pedal 42 is measured with the aid of a pedal travel sensor 170 which is preferably of redundant configuration.

The brake system 2 is capable of still permitting an active build-up of brake pressure in all four wheel brakes 4, 6, 8, 10 in the event of a failure of one of the two on-board electrical systems. For this purpose, the pressure provision device 14 is fed by the on-board electrical system 18 (denoted by B1), and the pressure provision device 16 is fed by the on-board electrical system 20 (denoted by B2).

The circuit isolating valve 150 is switchable by both on-board electrical systems 18, 20 and is also fed by both on-board electrical systems 18, 20 (denoted by B1 and B2).

The inlet valves 86, 88 are fed by the on-board electrical system 18 (in each case denoted by B1), and the inlet valves 110, 114 are fed by the on-board electrical system 20 (in each case denoted by B2).

In the brake circuit I, the outlet valve 90 is fed by the on-board electrical system 18 (denoted by B1), and the outlet valve 92 is fed by the on-board electrical system 20 (denoted by B2). In the brake circuit II, the outlet valve 120 is fed by the on-board electrical system 18 (denoted by B1), and the outlet valve 122 is fed by the on-board electrical system 20 (denoted by B2).

The brake system 2 advantageously comprises a total of only nine solenoid valves.

Figure 2:
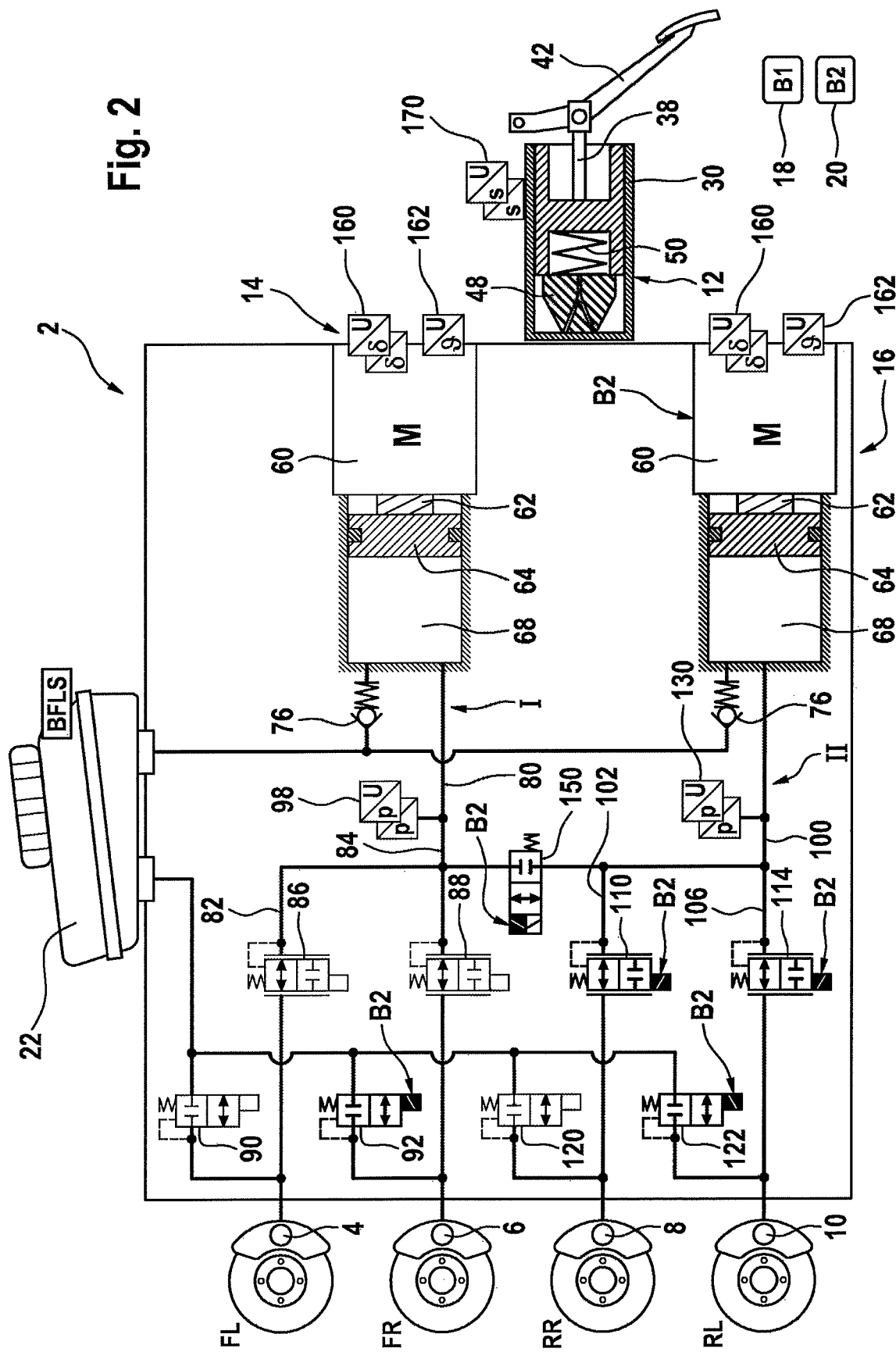
FIG. 2 shows the brake system as per FIG. 1 in the event of a failure of one on-board electrical system.

FIG. 2 illustrates the brake system 2 as per FIG. 1 in the event of a failure of one energy supply, specifically of the on-board electrical system 18 (B1), whilst on-board electrical system 20 (B2) continues to function correctly. The pressure provision device 14 is deactivated, because it is no longer fed by the on-board electrical system 18.

The outlet valves 90, 120, which can no longer be supplied with energy, are in their electrically deenergized closed state. The inlet valves 86, 88, which can no longer be supplied with energy, are in their electrically deenergized open state. The outlet valves 92, 122 are switchable. The inlet valves 110, 114 are switchable. The pressure provision device 15 is supplied with the energy of the on-board electrical system 20. The isolating valve 150 which can be fed by both on-board electrical systems 18, 20 is switchable, and is in its electrically deenergized closed state.

Even in the event of a complete failure of the on-board electrical system 18, the pressure provision device 16 can build up brake pressure in all four wheel brakes 4, 6, 8, 10.

Figure 3:
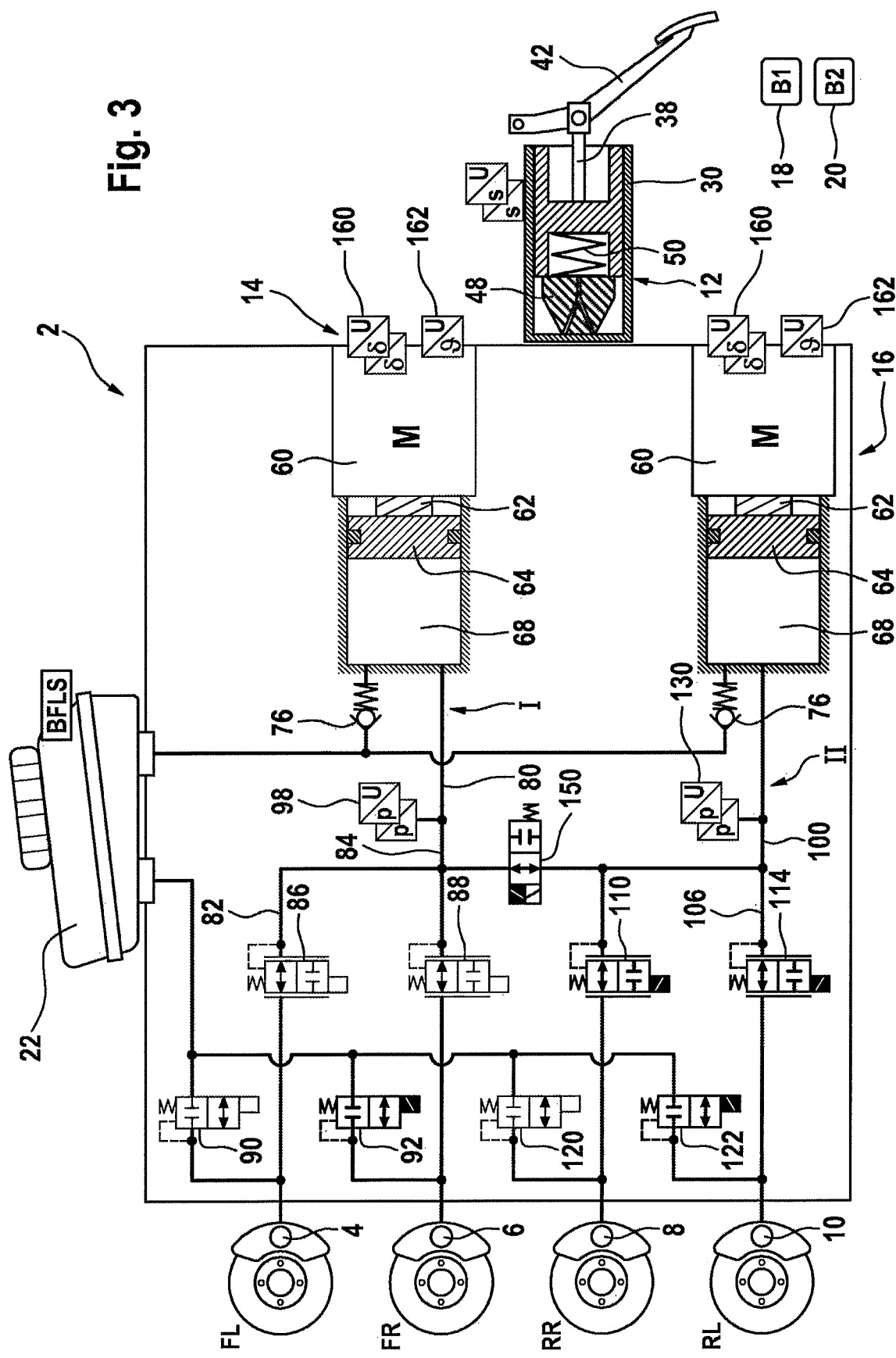
FIG. 3 shows the brake system as per FIG. 1 in the event of a failure of one on-board electrical system.

For this purpose, the isolating valve 150 is switched into its electrically deenergized open position. FIG. 3 shows the configuration of the brake system 2 in this state. In the brake circuit II, the inlet valves 110, 114 remain switchable by the brake circuit II, because they are electrically fed by the on-board electrical system 20 (B2). The inlet valves 86, 88 are no longer switchable, and are situated in the electrically deenergized open state. Since the isolating valve 150 is open, a hydraulic connection is produced between the pressure provision device 16 and the brake circuit I, such that, with the aid of the pressure provision device 16, pressure can also be built up in the wheel brakes 4, 6 through the open inlet valves 86, 88.

In each of the two brake circuits I, II, an outlet valve 92, 122 is still switchable. In this way, a dissipation of wheel pressure is possible for in each case both wheel brakes 4, 6 and 8, 10 respectively by means of the outlet valve 92, 122 which is still switchable (in particular even in the case of the isolating valve 150 being closed). Furthermore, closed-loop ABS control is possible in a select-low process, in which the respective outlet valve 92, 122 is used as a pressure control valve.

The brake system according to an aspect of the invention preferably comprises at least one first (4), one second (6), one third (8) and one fourth wheel brake (10) and a first electrically controllable pressure provision device 14 and a second electrically controllable pressure provision device 16 for actively building up pressure in the wheel brakes. A first brake circuit I and a second brake circuit are hydraulically formed, wherein, in the first brake circuit I, the first pressure provision device 14 is hydraulically connected to the first and the second wheel brake 4, 6, and in the second brake circuit II, the second pressure provision device 16 is hydraulically connected to the third and the fourth wheel brake 8, 10. Furthermore, a first on-board electrical system 18 and a second on-board electrical system 20 which is separate from the first on-board electrical system are provided, wherein the first pressure provision device 14 is fed, in particular exclusively, by the first on-board electrical system 18 and the second pressure provision device 16 is fed, in particular exclusively, by the second on-board electrical system 20.

The first pressure provision device 14 is non-separably hydraulically connected to the inlet valves 86, 88, which are open when electrically deenergized, of the first and second wheel brakes 4, 6 of the first brake circuit I and is separably connected to the inlet valves 110, 114, which are open when electrically deenergized, of the wheel brakes 8, 10 of the second brake circuit II. The second pressure provision device 16 is non-separably hydraulically connected to the inlet valves 110, 114, which are open when electrically deenergized, of the third and fourth wheel brakes 8, 10 of the second brake circuit II and is separably connected to the inlet valves 86, 88, which are open when electrically deenergized, of the wheel brakes 4, 6 of the first brake circuit I.

In other words, the corresponding pressure provision device of a particular brake circuit is connected directly to the inlet valves of the wheel brakes of said brake circuit and is separably connected to the inlet valves of the wheel brakes of the other brake circuit. The corresponding pressure provision device of a particular brake circuit is preferably separably connected to the inlet valves of the wheel brakes of the other brake circuit by means of the isolating device 150.

The expression "non-separably hydraulically connected" is accordingly to be understood in the sense of "directly hydraulically connected", that is to say, in the hydraulic connection, there is no element, for example valve, by means of which the connection could be repeatedly produced or shut off in controlled fashion.

The invention claimed is:

1. A brake system, comprising four hydraulically actuatable wheel brakes, wherein each of the four hydraulically actuatable wheel brakes is assigned one outlet valve which is closed when electrically deenergized, and wherein each of the four hydraulically actuatable wheel brakes is assigned one inlet valve which is open when electrically deenergized,
   comprising a simulator which is actuatable by a brake pedal,
   wherein two pressure provision devices are provided for actively building up pressure in the four hydraulically actuatable wheel brakes,
   wherein two brake circuits are hydraulically formed, wherein each of the two brake circuits includes one of the two pressure provision devices hydraulically connected to two of the four hydraulically actuatable wheel brakes,
   wherein two separate on-board electrical systems are provided, and wherein each of the two pressure provision devices is fed by one of the two on-board electrical systems, wherein the two separate on-board electrical systems are galvanically separate, and
   wherein an isolating device is provided having (i) a connecting position in which the two brake circuits are hydraulically connected to one another such that each of the four hydraulically actuatable wheel brakes is hydraulically connected to both of the two pressure provision devices, and (ii) an isolating position in which the two brake circuits are hydraulically isolated from one another such that each of the four hydraulically actuatable wheel brakes is hydraulically connected to exactly one of the two pressure provision devices, and
   wherein at least one of the two pressure provision devices is directly and non-separably hydraulically connected to two of the inlet valves, which are open when electrically deenergized, of two of the four hydraulically actuatable wheel brakes of one of the two brake circuits and is separably connected to two more of the inlet valves, which are open when electrically deenergized, of the other two of the four hydraulically actuatable wheel brakes of the other one of the two brake circuits by means of the isolating device.

2. The brake system as claimed in claim 1, wherein each of the pressure provision devices is fed by exactly one of the two on-board electrical systems.

3. The brake system as claimed in claim 2, wherein a first of the two pressure provision devices is fed exclusively by a first of the two on-board electrical systems, and the other of the two pressure provision devices is fed exclusively by the other of the two on-board electrical systems.

4. The brake system as claimed in claim 1, wherein a first of the two pressure provision devices is fed exclusively by a first of the two on-board electrical systems, and the other of the two pressure provision devices is fed exclusively by the other of the two on-board electrical systems.

5. The brake system as claimed in claim 1, wherein no check valve is connected hydraulically in parallel with respect to any inlet valve assigned to the four hydraulically actuatable wheel brakes.

6. The brake system as claimed in claim 1, wherein one closed state detection device is provided for each of the inlet valves.

7. The brake system as claimed in claim 1, wherein the two inlet valves of one of the two brake circuits are fed by one of the two on-board electrical systems.

8. The brake system as claimed in claim 1, wherein, in each of the two brake circuits, one outlet valve is fed by one of the two on-board electrical systems.

9. The brake system as claimed in claim 1, wherein a travel sensor is provided for detecting pedal travel of the brake pedal.

10. The brake system as claimed in claim 1, wherein the isolating device is formed as an isolating valve which is closed when electrically deenergized.

11. The brake system as claimed in claim 1, wherein the isolating device comprises two isolating valves, each of which is fed by exactly one of the two on-board electrical systems.

12. A method for operating a brake system as claimed in claim 1, wherein, in an event of a failure of one of the two on-board electrical systems, the isolating device is switched into its connecting position.

13. A method for operating a brake system as claimed in claim 1, wherein, in an event of a pressure dissipation being required in one of the four hydraulically actuatable wheel brakes and a closed state of an inlet valve which cannot be opened being identified, the outlet valve assigned to the one of the four hydraulically actuatable wheel brakes is opened.

14. The brake system as claimed in claim 1, wherein the two separate on-board electrical systems are electrically independent of one another.

15. The brake system as claimed in claim 1, wherein each of the two separate on-board electrical systems is powered by a respective independent power supply.

16. A brake system, comprising four hydraulically actuatable wheel brakes, wherein each of the four hydraulically actuatable wheel brakes is assigned one outlet valve which is closed when electrically deenergized, and wherein each of the four hydraulically actuatable wheel brakes is assigned one inlet valve which is open when electrically deenergized,
   comprising a simulator which is actuatable by a brake pedal,
   wherein two pressure provision devices are provided for actively building up pressure in the four hydraulically actuatable wheel brakes,
   wherein two brake circuits are hydraulically formed, wherein each of the two brake circuits includes one of the two pressure provision devices hydraulically connected to two of the four hydraulically actuatable wheel brakes,
   wherein two separate on-board electrical systems are provided, and wherein each of the two pressure provision devices is fed by one of the two on-board electrical systems, and wherein an isolating device is provided having (i) a connecting position in which the two brake circuits are hydraulically connected to one another such that each of the four hydraulically actuatable wheel brakes is hydraulically connected to both of the two pressure provision devices, and (ii) an isolating position in which the two brake circuits are hydraulically isolated from one another such that each of the four hydraulically actuatable wheel brakes is hydraulically connected to exactly one of the two pressure provision devices, and
   wherein each of the two pressure provision devices is directly and non-separably hydraulically connected to two of the inlet valves, which are open when electrically deenergized, of two of the four hydraulically actuatable wheel brakes of one of the two brake circuits and is separably connected to two more of the inlet valves, which are open when electrically deenergized, of the other two of the four hydraulically actuatable wheel brakes of the other one of the two brake circuits by means of the isolating device.

17. A brake system, comprising four hydraulically actuatable wheel brakes, wherein each of the four hydraulically actuatable wheel brakes is assigned one outlet valve which is closed when electrically deenergized, and wherein each of the four hydraulically actuatable wheel brakes is assigned one inlet valve which is open when electrically deenergized,
   comprising a simulator which is actuatable by a brake pedal,
   wherein two pressure provision devices are provided for actively building up pressure in the four hydraulically actuatable wheel brakes,
   wherein two brake circuits are hydraulically formed, wherein each of the two brake circuits includes one of the two pressure provision devices hydraulically connected to two of the four hydraulically actuatable wheel brakes,
   wherein two separate on-board electrical systems are provided, and wherein each of the two pressure provision devices is fed by one of the two on-board electrical systems, and
   wherein an isolating device is provided having (i) a connecting position in which the two brake circuits are hydraulically connected to one another such that each of the four hydraulically actuatable wheel brakes is hydraulically connected to both of the two pressure provision devices, and (ii) an isolating position in which the two brake circuits are hydraulically isolated from one another such that each of the four hydraulically actuatable wheel brakes is hydraulically connected to exactly one of the two pressure provision devices,
   wherein at least one of the two pressure provision devices is directly and non-separably hydraulically connected to two of the inlet valves, which are open when electrically deenergized, of two of the four hydraulically actuatable wheel brakes of one of the two brake circuits and is separably connected to two more of the inlet valves, which are open when electrically deenergized, of the other two of the four hydraulically actuatable wheel brakes of the other one of the two brake circuits by means of the isolating device, and
   wherein the isolating device is fed by each of the two on-board electrical systems.

18. The brake system as claimed in claim 17, wherein the isolating device is formed as an isolating valve which is closed when electrically deenergized.

19. The brake system as claimed in claim 17, wherein the isolating device comprises two isolating valves, each of which is fed by exactly one of the two on-board electrical systems.

* * * * *